United States Patent
Kim et al.

(10) Patent No.: US 12,283,398 B2
(45) Date of Patent: Apr. 22, 2025

(54) METHOD AND APPARATUS FOR MANUFACTURING INSULATING SHEET

(71) Applicants: BS TECHNICS Co., Ltd., Gyeonggi-do (KR); KOREA ELECTRIC TERMINAL CO., LTD, Incheon (KR)

(72) Inventors: Jun Sik Kim, Gyeonggi-do (KR); Jung Sik Choi, Gyeonggi-do (KR); Young Do Kim, Gyeonggi-do (KR); Tae Yeon Jo, Gyeonggi-do (KR)

(73) Assignees: BS TECHNICS Co., Ltd., Gyeonggi-do (KR); KOREA ELECTRIC TERMINAL CO., LTD, Incheon (KR)

( * ) Notice: Subject to any disclaimer, the term of this patent is extended or adjusted under 35 U.S.C. 154(b) by 0 days.

(21) Appl. No.: 18/232,920

(22) Filed: Aug. 11, 2023

(65) Prior Publication Data
US 2025/0014786 A1 Jan. 9, 2025

(30) Foreign Application Priority Data
Jul. 7, 2023 (KR) .................. 10-2023-0088428

(51) Int. Cl.
*B23K 26/38* (2014.01)
*B23K 26/351* (2014.01)
(Continued)

(52) U.S. Cl.
CPC .......... *H01B 19/04* (2013.01); *B23K 26/351* (2015.10); *B23K 26/38* (2013.01); *H01B 17/16* (2013.01);
(Continued)

(58) Field of Classification Search
CPC ...... B23K 26/38; B23K 26/351; B23K 26/06; B29C 53/02; Y10T 156/1043; H01B 19/00; H01M 50/20
(Continued)

(56) References Cited

U.S. PATENT DOCUMENTS

2013/0306608 A1* 11/2013 Schaefer ............ B23K 26/0006
219/121.72

FOREIGN PATENT DOCUMENTS

| CN | 105932336 A | * 9/2016 | .......... H01M 10/058 |
| KR | 10-0960302 B1 | 6/2010 | |

(Continued)

OTHER PUBLICATIONS

English machine translation for CN105932336 (Year: 2016).*
(Continued)

*Primary Examiner* — Scott W Dodds
(74) *Attorney, Agent, or Firm* — Harness, Dickey & Pierce, P.L.C.

(57) ABSTRACT

Disclosed is a method of manufacturing an insulating sheet, comprising: forming at least a groove on a flat sheet; a first cutting step for cutting a side surface of the groove by irradiating a laser beam to a side surface of the sheet; a second cutting step for cutting the insulating sheet to completely separate the groove from the insulating sheet by irradiating a laser beam from above the groove having the side surface cut; a tape attaching step for attaching a tape to an outer surface of the insulating sheet; and a bending step for bending one end portion of the surface of the insulating sheet having the tape attached toward a place where the tape is attached. It is possible to mass-produce the insulating sheets having a three-dimensional shape, regarded as being difficult to manufacture with a mold.

11 Claims, 19 Drawing Sheets

(51) Int. Cl.
  *H01B 17/16* (2006.01)
  *H01B 17/56* (2006.01)
  *H01B 19/04* (2006.01)
  *H01B 3/30* (2006.01)

(52) U.S. Cl.
  CPC ............. *H01B 17/56* (2013.01); *H01B 3/305* (2013.01); *H01B 3/307* (2013.01)

(58) Field of Classification Search
  USPC ........................................................ 156/221
  See application file for complete search history.

(56) References Cited

FOREIGN PATENT DOCUMENTS

| KR | 10-1367481 | B1 | | 2/2014 | |
|----|----|----|----|----|----|
| KR | 10-1937936 | B1 | | 1/2019 | |
| KR | 20190084752 | A | * | 7/2019 | ............. B23B 26/38 |
| KR | 102148997 | B1 | * | 8/2020 | .......... H01M 50/116 |
| KR | 20210006204 | A | * | 1/2021 | ............ B65H 35/008 |
| KR | 102230937 | B1 | * | 3/2021 | .......... B29C 66/4332 |
| KR | 102292356 | B1 | * | 8/2021 | .......... H01M 50/116 |
| WO | WO-2020121707 | A1 | * | 6/2020 | ............ H01M 50/50 |

OTHER PUBLICATIONS

English machine translation for KR102148997 (Year: 2020).*
English machine translation for KR102230937 (Year: 2021).*
English machine translation for KR102292356 (Year: 2021).*
English machine translation for KR20190084752 (Year: 2019).*
English machine translation for KR20210006204 (Year: 2021).*
English machine translation for WO2020121707 (Year: 2020).*

* cited by examiner

METHOD AND APPARATUS FOR MANUFACTURING INSULATING SHEET

CROSS-REFERENCE TO RELATED APPLICATIONS

This application claims the benefit and priority to Korean Patent Application No. 10-2023-0088428, filed on Jul. 7, 2023. The entire disclosures of the applications identified in this paragraph are incorporated herein by references.

FIELD

The present invention relates to a technology for manufacturing an insulating sheet, and more particularly, to a method of manufacturing a three-dimensional insulating sheet without using a press mold and an apparatus for manufacturing the same.

BACKGROUND

Electric vehicles are focused as a next-generation transportation means capable of substituting engine vehicles that generate driving force by combusting fossil fuels. The electric vehicles generally have an electric motor for driving wheels connected to a lower part of a chassis and a secondary battery as an energy source for driving the electric motor, so that the electric vehicle can move by driving the electric motor using the electric power charged in the secondary battery.

A structure of the battery used in such an electric vehicle includes a battery module for charging electricity and a battery tray for supporting and fixing the battery module to an engine room of the vehicle.

Meanwhile, an insulating sheet is indispensably attached to the tray made of metal in order to avoid various accidents such as electrical malfunction or fire caused by conduction of leakage current from the battery. Since the battery tray has various three-dimensional shapes such as a rectangular parallelepiped shape, the insulating sheets attached thereto are also manufactured in flat or three-dimensional shapes.

In general, the insulating sheets are manufactured using a forming mold and a cutting mold. However, while the mold processing is suitable for a flat shape in forming and cutting metal or polymer products by installing special tools on a press machine that performs rectilinear reciprocating motions, such a mold processing has a limitation in manufacturing of the insulating sheets having three-dimensional shapes.

In addition, since the mechanical cutting machine cuts a sheet by pressing a blade shaped in a preset pattern with a press, burrs may be generated on the cut surface of the insulating sheet disadvantageously. Therefore, the mechanical cutting is not suitable for precise cutting of the insulating sheet.

CITATION LIST

Patent Literatures

Patent Literature 1: Korean Patent No. 10-0960302
Patent Literature 2: Korean Patent No. 10-1367481
Patent Literature 3: Korean Patent No. 10-1937936

SUMMARY

In view of the problems of the prior art described above, it is an object of the present invention to provide a method and apparatus for manufacturing an insulating sheet, by which a three-dimensional insulating sheet can be precisely manufactured without using a press mold, and a production yield of the insulating sheet can be significantly improved.

In order to address the aforementioned problems, according to an aspect of the present invention, there is provided a method of manufacturing an insulating sheet, comprising: forming at least a groove on a flat sheet; a first cutting step for cutting a side surface of the groove by irradiating a laser beam to a side surface of the sheet; a second cutting step for cutting the insulating sheet to completely separate the groove from the insulating sheet by irradiating a laser beam from above the groove having the side surface cut; a tape attaching step for attaching a tape to an outer surface of the insulating sheet; and a bending step for bending one edge of the surface of the insulating sheet having the tape attached toward a place where the tape is attached.

According to another aspect of the present invention, there is provided an apparatus for manufacturing the insulating sheet described above, the apparatus comprising a jig unit that fixes the insulating sheet in an pneumatic suctioning manner in the tape attaching step, wherein the jig unit has a sheet installation jig for installing the insulating sheet, the sheet installation jig having a first suction space having an opened bottom and a hollowed inside and a jig body having a plurality of suction holes on a surface where the insulating sheet is installed, and a jig base combined with the sheet installation jig to provide a suction force to the sheet installation jig, the jig base having a second suction space having an opened top and an hollowed inside to provide a sealed space along with the first suction space, and a base having a coupling hole where a vacuum line is connected on one side surface of the second suction space.

The apparatus may further comprise a primary bending jig base for primarily bending the insulating sheet in the bending step, wherein the primary bending jig base has a base body where an inner surface of the insulating sheet is closely fitted, the base body having a trench formed to receive the pressure punch on a surface facing the bending surface of the insulating sheet, and an upper plate provided in rear of the trench in the base body to form a fitting space portion where the edge of the insulating sheet is inserted.

The apparatus may further comprise a secondary bending device that performs secondary bending for the insulating sheet in the bending step, wherein the secondary bending device has a base plate where the insulating sheet seats, a pressure roller module provided over the base plate to press and bend the portion of the insulating sheet subjected to the primary bending by means of rotation of the roller, and inner and outer sheet guides respectively provided in the front and rear directions (Y-axis direction) of the roller with respect to the roller over the base plate to guide the insulating sheet to accurate bending positions while coming into contact with inner and outer sides of the insulating sheet during bending of the insulating sheet.

Advantageous Effects

Using the method of manufacturing the insulating sheet according to the present invention described above, it is possible to cut a plurality of grooves formed on a flat sheet individually and continuously to match a three-dimensional shape. As a result, it is possible to precisely cut even a three-dimensional complex shape implemented on a flat sheet that is difficult to cut in the prior art which uses molds.

DETAILED DESCRIPTION

Figure 1:
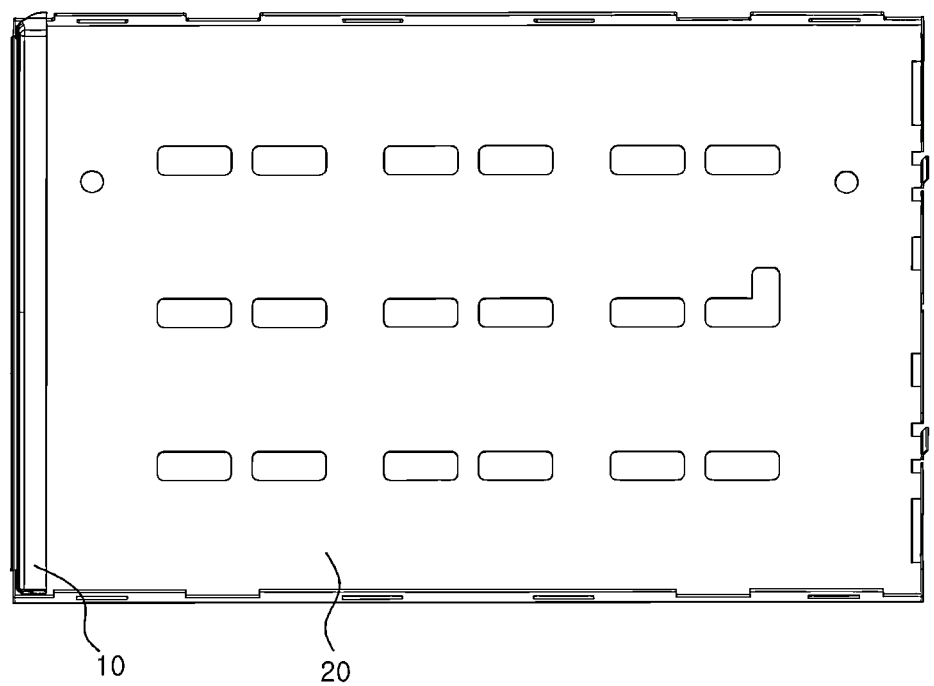
FIG. 1 is a perspective view illustrating a state in which an insulating sheet manufactured according to an embodiment of the present invention is installed in a battery tray.

The present invention will now be described in detail with reference to the accompanying drawings, in which like reference numerals denote like elements throughout the entire specification, and they will not be repeatedly described intentionally. In the following description, any specific word or sentence for the related art will not be provided for simplicity purposes if it unnecessarily obscures the subject matter of the invention. The embodiments of the invention are provided to provide more perfect understanding for those who ordinarily skilled in the art. The figures are not necessarily to scale, and certain features and certain views of the figures may be shown exaggerated in scale or in schematic in the interest of clarity and conciseness.

<Insulating Sheet>

Figure 2:
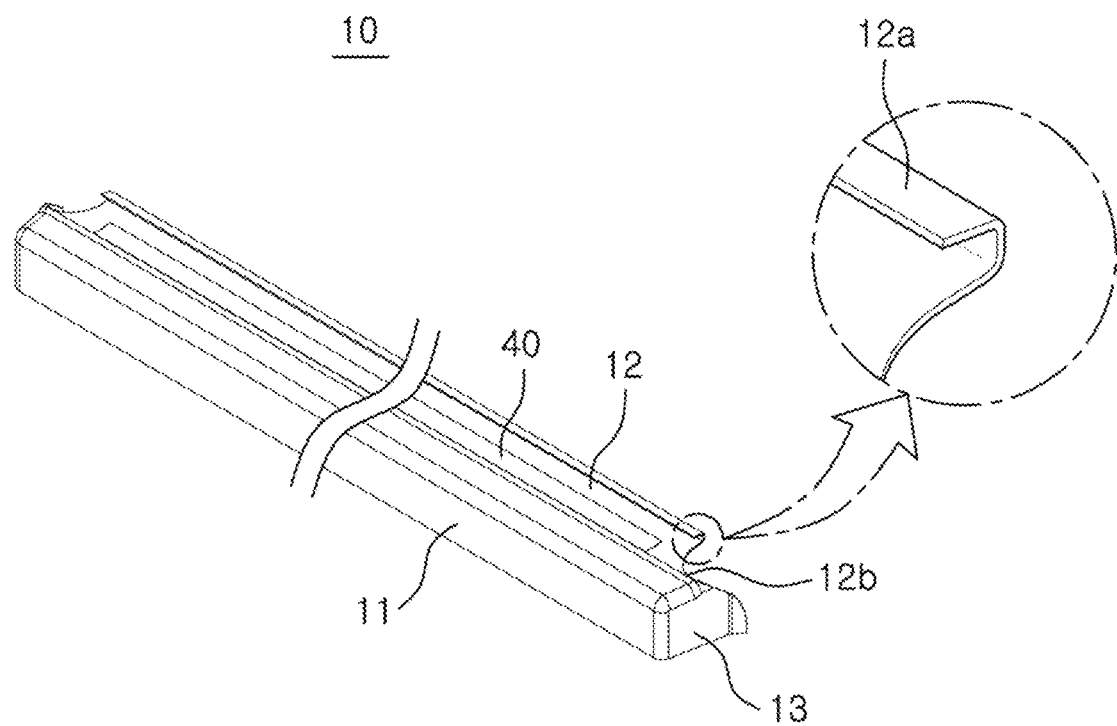
FIG. 2 is a view illustrating an insulating sheet manufactured according to an embodiment of the present invention.

FIG. 1 is a perspective view illustrating a state in which an insulating sheet manufactured according to an embodiment of the present invention is installed in a battery tray. FIG. 2 is a perspective view illustrating the insulating sheet of FIG. 1.

Referring to FIGS. 1 and 2, the insulating sheet 10 is a structure installed on both side surfaces of a tray 20 that houses a battery module (not shown) to provide voltage-withstanding insulation for the battery module. More specifically, the insulating sheet 10 is placed on both sides of the tray 20 to prevent a horizontal surface, side surfaces, and end surfaces forming both ends of the battery module (not shown) from coming into contact with the tray 20, that is, avoid the ends of the battery module from directly coming into contact with the tray 20 and avoid leakage current of the battery module from flowing to the tray 20.

The insulating sheet 10 is stably fixed by the tape 40 while it is inserted into both side surfaces of the tray 20. For this purpose, the insulating sheet 10 has an L-shaped cross section having a vertical surface 11, a bottom surface 12, and side surfaces 13. Here, the vertical surface 11 is a part placed on a bottom surface of the tray 20, on which the horizontal surface (lower surface) forming both ends of the battery module is placed.

The bottom surface 12 is placed on the side surface of the tray 20 and comes into contact with both ends of the battery module. A bending portion 12a bent by about 180 degrees to the rear side, that is, in the lateral direction of the tray 20, is formed in upper end of the bottom surface 12. The bending portion 12a has a substantially U-shaped cross section and is inserted into the upper end of the side surface of the tray 20 to stably fix the insulating sheet 10 without being separated from the tray 20. Notches 12b are provided at both ends of the bottom surface 12 to facilitate bending of the bending portion.

A tape 40 is attached to the bottom surface 12 of the insulating sheet 10, so that the insulating sheet 10 can be stably fixed to the tray 20. In addition, both side surfaces 13 of the insulating sheet 10 are portions coming into contact with side surfaces that form both ends of the battery module.

In this manner, the insulating sheet according to the present invention is securely fixed by the tape while being inserted into both side surfaces of the battery tray, so that the battery module can be stably insulated without being separated from the tray even when an external impact is applied. The insulating sheet is made of a non-conductive material in the form of a very thin film. Preferably, the insulating sheet is made of a plastic material selected from a group consisting of polyethylene (PE), polypropylene (PP), polyamide (PA), polyethylene (PET), polycarbonate Acrylonitrile Butadiene Styrene (PC+ABS), or polycarbonate (PC).

<Method of Manufacturing Insulating Sheet>

Figure 3:
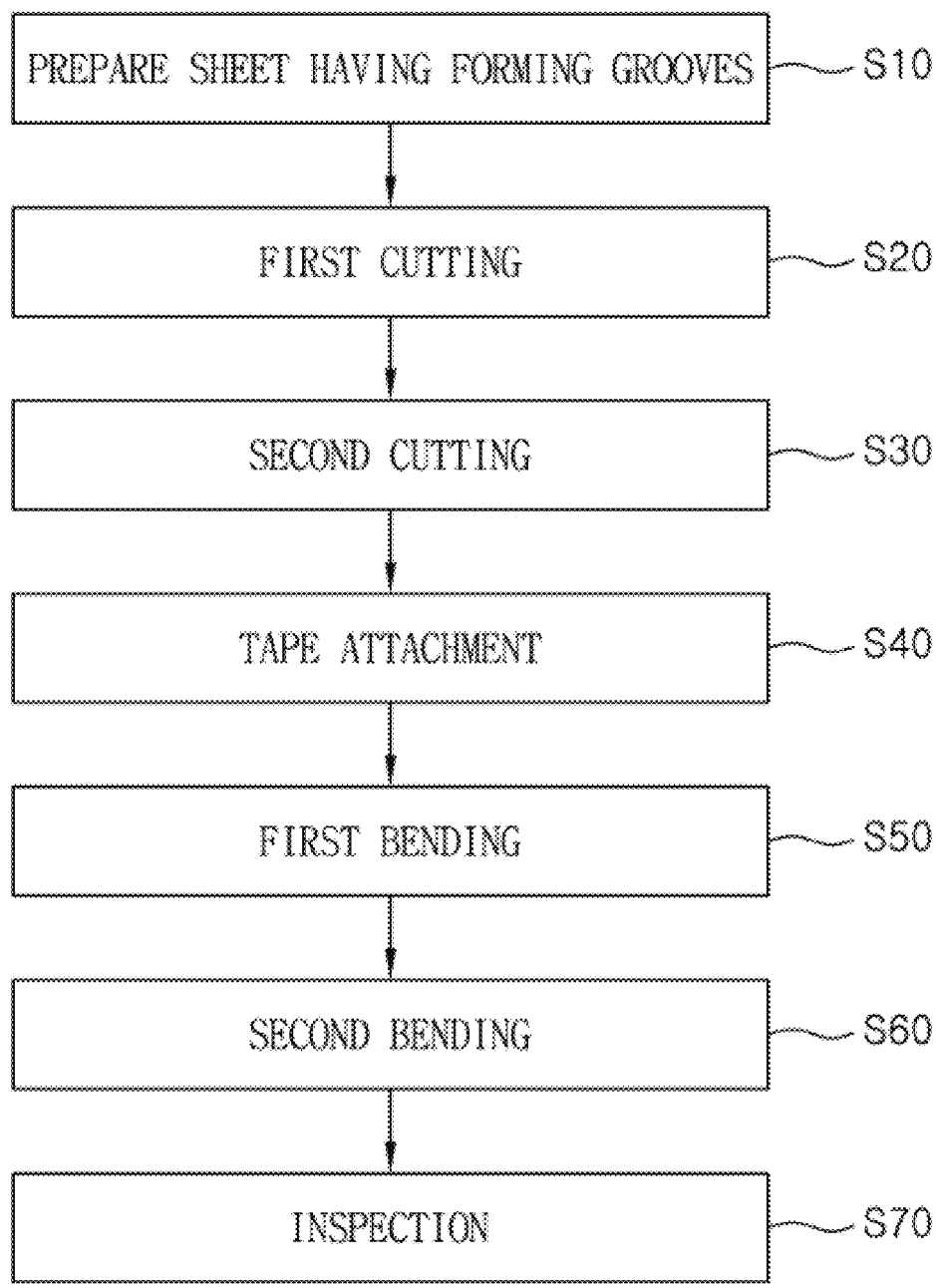
FIG. 3 is a flow chart illustrating a sequence of manufacturing the insulating sheet according to an embodiment of the present invention.

FIG. 3 is a flow chart illustrating a sequence of manufacturing the insulating sheet according to the present invention.

Referring to FIG. 3, a method of manufacturing the insulating sheet according to the present invention includes: forming at least a groove on a flat sheet (S10); a first cutting step (S20) for cutting a side surface of the groove by irradiating a laser beam to a side surface of the sheet; a second cutting step (S30) for cutting the groove to completely separate the groove from the sheet by irradiating a laser beam from above the groove having the side surfaces cut; a tape attaching step (S40) for attaching a tape to an outer surface of the insulating sheet; primary and secondary bending steps (S50, S60) for bending one edge of the surface of the insulating sheet to which the tape is attached toward a portion where the tape is attached; and an inspection step for inspecting voltage-withstanding insulation of the finally obtained insulating sheet. In this case, the primary bending is performed by bending the sheet at a certain angle using a pressure punch, and the secondary bending is finally performed by bending the sheet at a desired angle using a rotating roller.

Hereinafter, each step of the aforementioned method of manufacturing the insulating sheet will be described in more detail along with a manufacturing apparatus for manufacturing the insulating sheet.

<Material Preparation Step>

Figure 4:
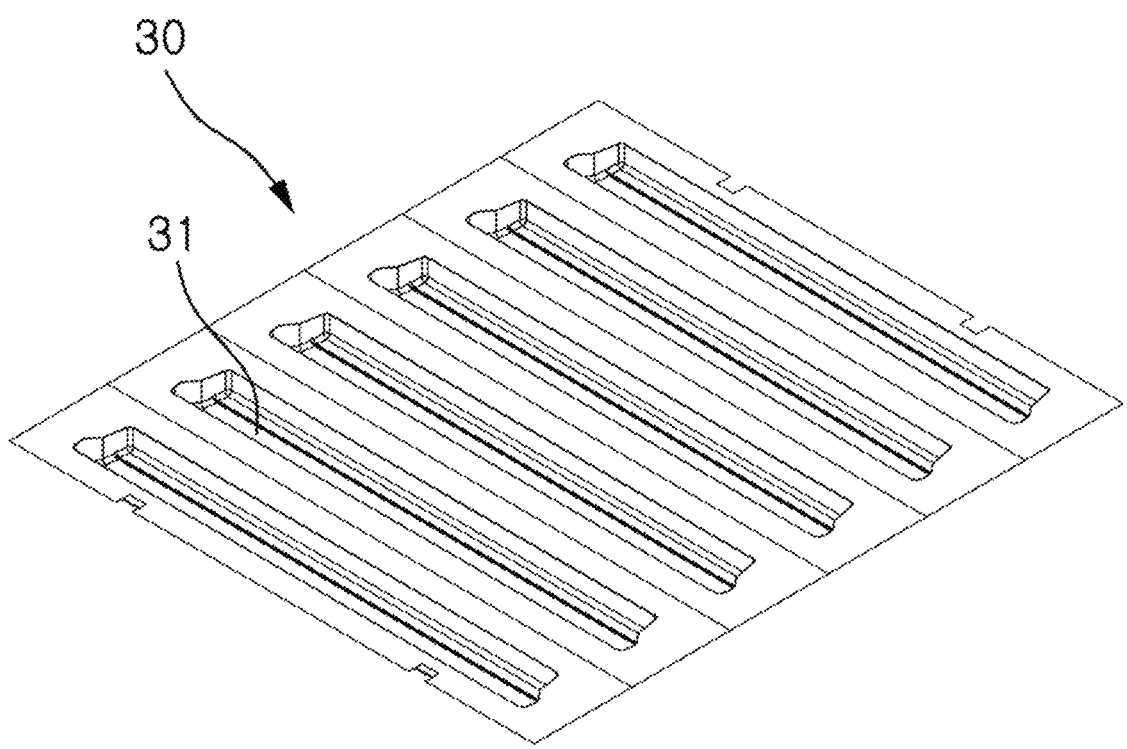
FIG. 4 is a perspective view illustrating a material (flat sheet having grooves) for manufacturing the insulating sheet according to an embodiment of the present invention.

FIG. 4 is a perspective view illustrating a flat sheet having grooves for manufacturing an insulating sheet according to an embodiment of the present invention.

Referring to FIG. 4, the flat sheet 30 has a plurality of (e.g., six) grooves 31 elongating in a longitudinal direction of the sheet 30. The grooves 31 are cut and bent in a certain three-dimensional shape to obtain the insulating sheet 10 of FIG. 2. That is, six insulating sheets 10 can be manufactured from a single flat sheet 30 simultaneously.

<Laser Cutting Step>

Figure 5:
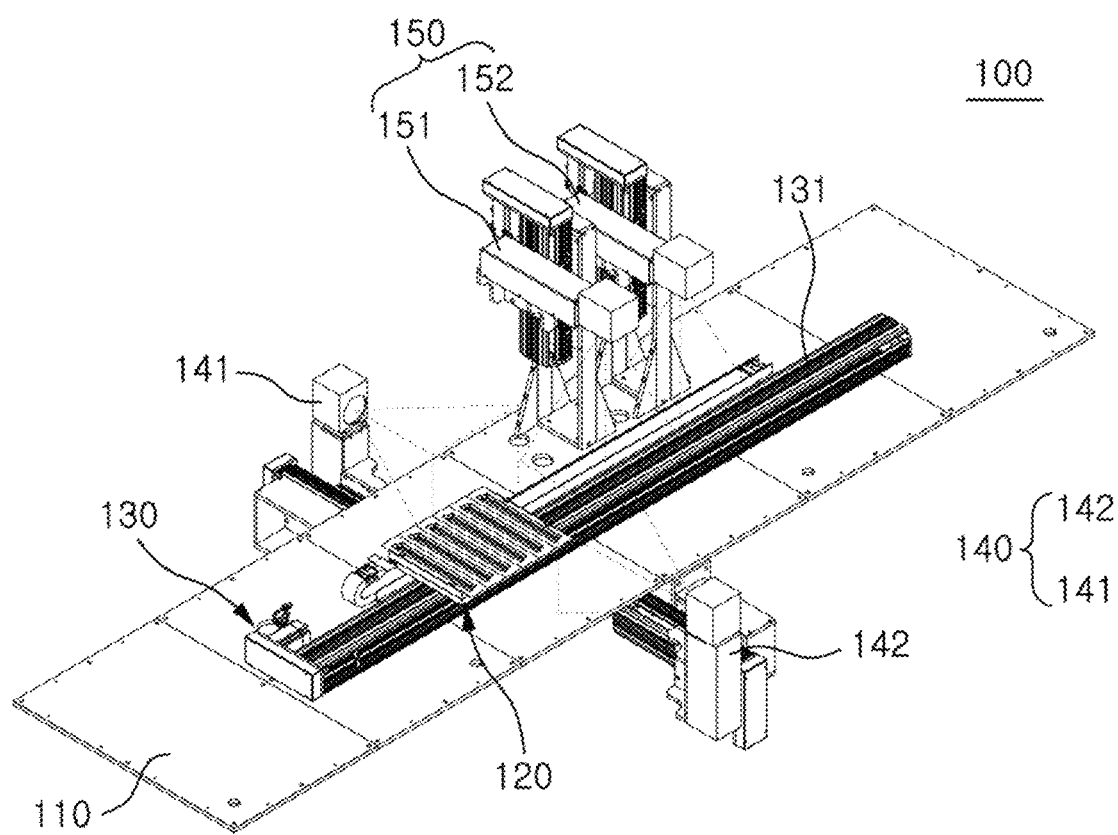
FIG. 5 is a perspective view illustrating a cutting device for manufacturing an insulating sheet according to an embodiment of the present invention.
Figure 6:
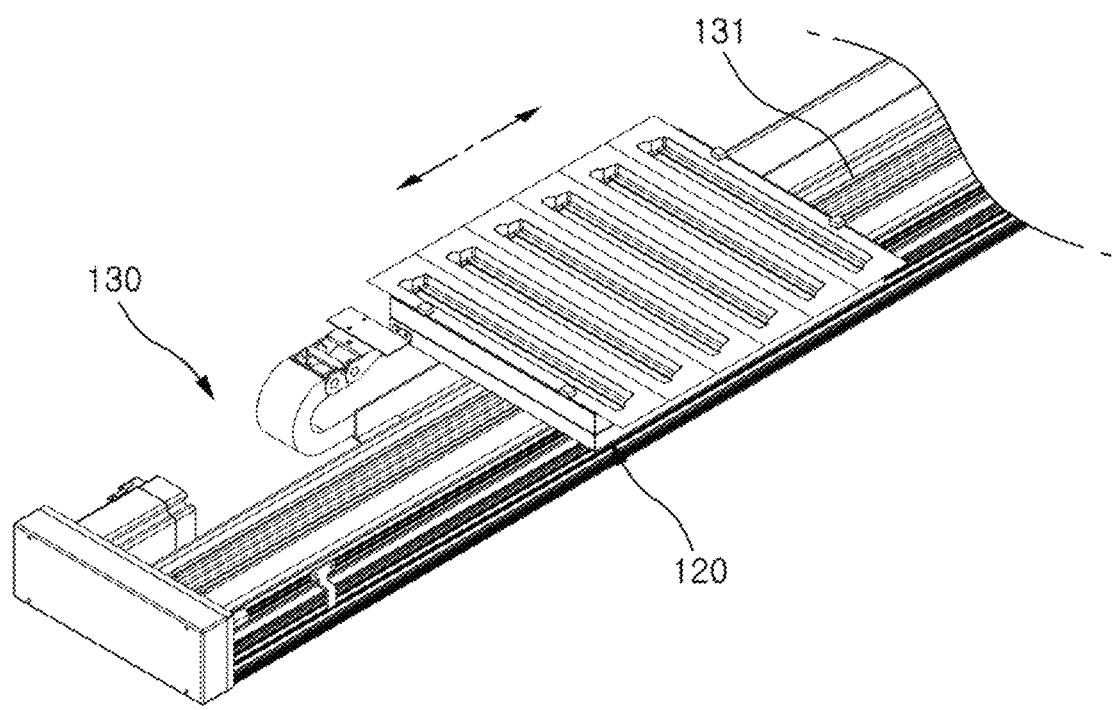
FIG. 6 is a perspective view illustrating a jig unit and a jig transfer unit of the cutting device according to an embodiment of the present invention.
Figure 7:
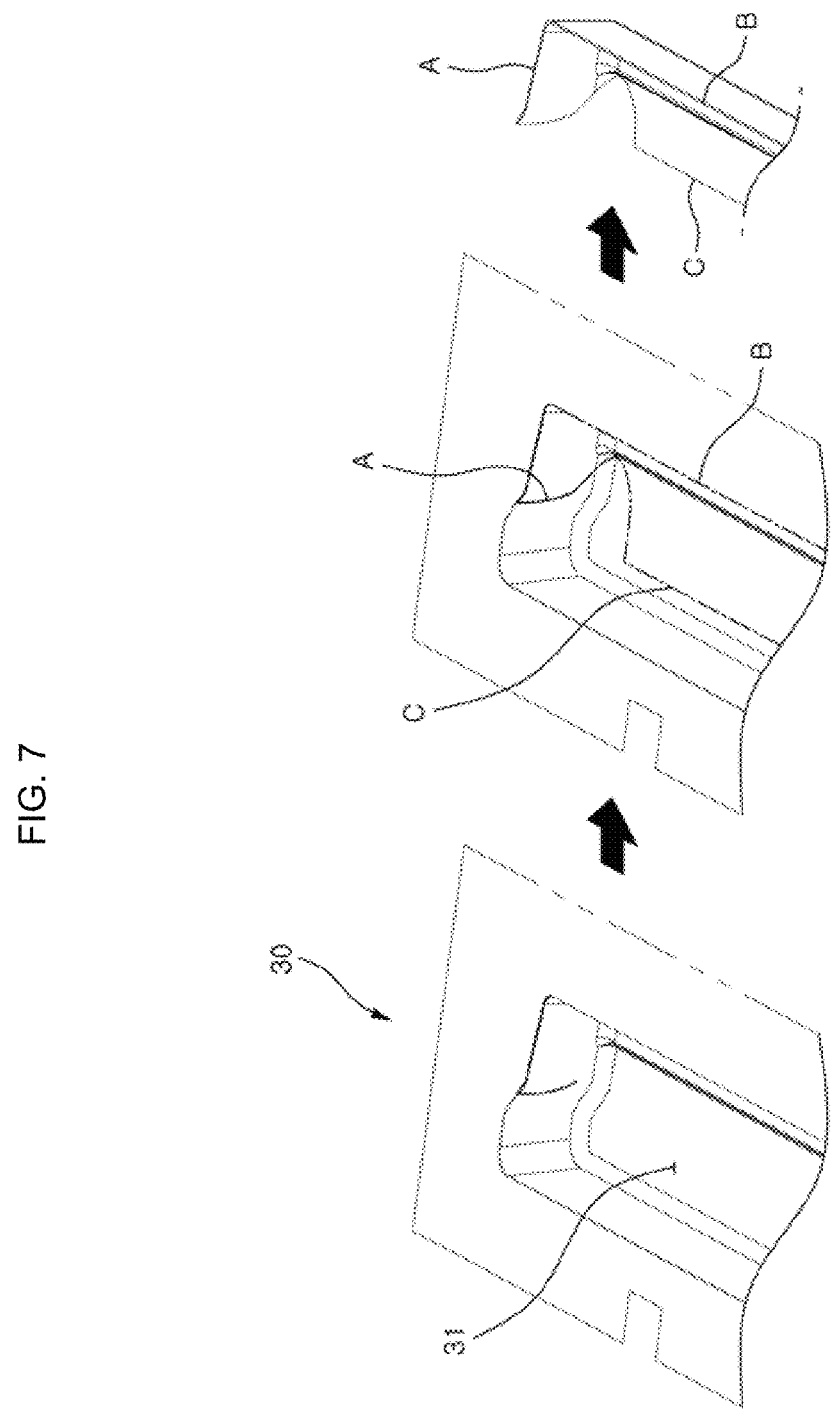
FIG. 7 is a view illustrating a cutting line for the grooves implemented on the material by using the cutting device according to an embodiment of the present invention.

FIG. 5 is a perspective view illustrating a cutting device for manufacturing an insulating sheet according to an embodiment of the present invention, and FIG. 6 is a perspective view illustrating a jig unit and a jig transfer unit of the cutting device according to an embodiment of the present invention. FIG. 7 is a diagram illustrating a cutting line for the groove implemented on the sheet using the cutting device.

Referring to FIGS. 5 and 6, the cutting device irradiates multi-laser beams onto the sheet 30 to cut the grooves 31 implemented on the sheet 30 in a three-dimensional shape.

For this purpose, the laser cutting device 100 has a main body 110, a jig unit 120 on which the sheet 30 is seated, a jig transfer unit 130 that transfers the jig unit 120, a side laser cutting unit 140 for cutting side surfaces of the sheet 30, and a planar laser cutting unit 150 for cutting the plane of the sheet 30.

The jig unit 120 is provided to fix the sheet 30 as a cutting target in a vacuum suctioning manner and is shaped to match the sheet 30 such that the sheet 30 can be robustly installed without being spaced apart.

The jig transfer unit 130 elongates in a straight rail shape in the main body 110 and is provided to transfer the jig unit 120 from a material input zone to a material discharge zone via a material cutting zone. A driving part of the jig transfer unit 130 drives the jig unit 120 while moving in any driving type widely known in the art such as a linear motor type, a thread type, or a belt transfer type.

The side laser cutting unit 140 includes a first laser cutting unit 141 and a second laser cutting unit 142 arranged as a pair facing each other on both sides of the transfer rail 131. Note that the first laser cutting unit 141 is provided on any one side of the transfer rail 131 to cut one side of the groove 31 provided on the sheet 30 (line A in FIG. 7). In addition, the second laser cutting unit 142 is provided on the other side of the transfer rail 131 to cut the other side of the groove 31.

As described above, the side laser cutting unit 140 can cut both side surfaces of the groove 31 simultaneously by irradiating laser beams along the cutting lines to both side surfaces of the cuboid-shaped groove 31 elongating in the width direction of the sheet 30.

The planar laser cutting unit 150 cuts the grooves 31 from above the sheet 30. The planar laser cutting unit 150 includes a third laser cutting unit 151 and a fourth laser cutting unit 152 arranged in front and rear sides above the transfer rail 131. The third laser cutting unit 151 is disposed immediately behind the side laser cutting unit 140, and the fourth laser cutting unit 152 is disposed immediately behind the third laser cutting unit 151 to cut the grooves 31. That is, the third and fourth planar laser cutting units 151 and 152 cut the remaining part of the grooves 31 subjected to the primary cutting for complete separation from the sheet 30.

More specifically, the third planar laser cutting unit 151 cuts the sheet 30 by irradiating a laser beam to the longitudinal sides that forms the upper end of the groove 31 in the width direction of the groove 31 (along the line B in FIG. 7). The fourth planar laser cutting unit 152 cut the sheet 30 by irradiating a laser beam to the bottom surface of the groove 31 in the width direction of the groove 31 (along the line C in FIG. 7).

In this manner, according to the present invention, the first and second side laser cutting units disposed on both lateral sides of the sheet and the third and fourth planar laser cutting units disposed in the front-rear direction above the sheet are arranged organically in a three-dimensional space. As a result, it is possible to cut a plurality of grooves provided on a single sheet individually and continuously in desired three-dimensional shapes.

<Tape Attaching Step>

Figure 8:
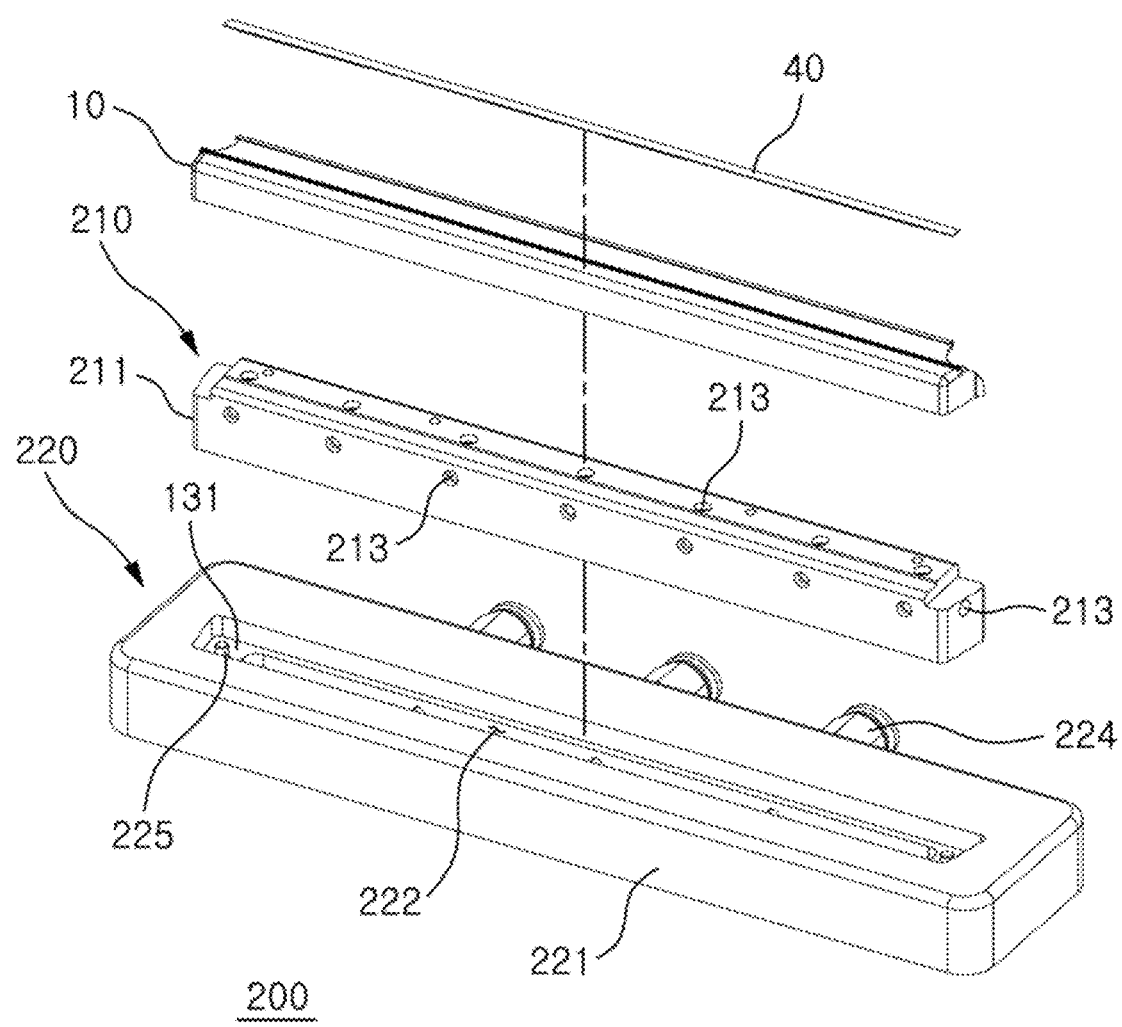
FIG. 8 is an exploded perspective view illustrating a tape attaching device for manufacturing an insulating sheet according to an embodiment of the present invention.
Figure 9:
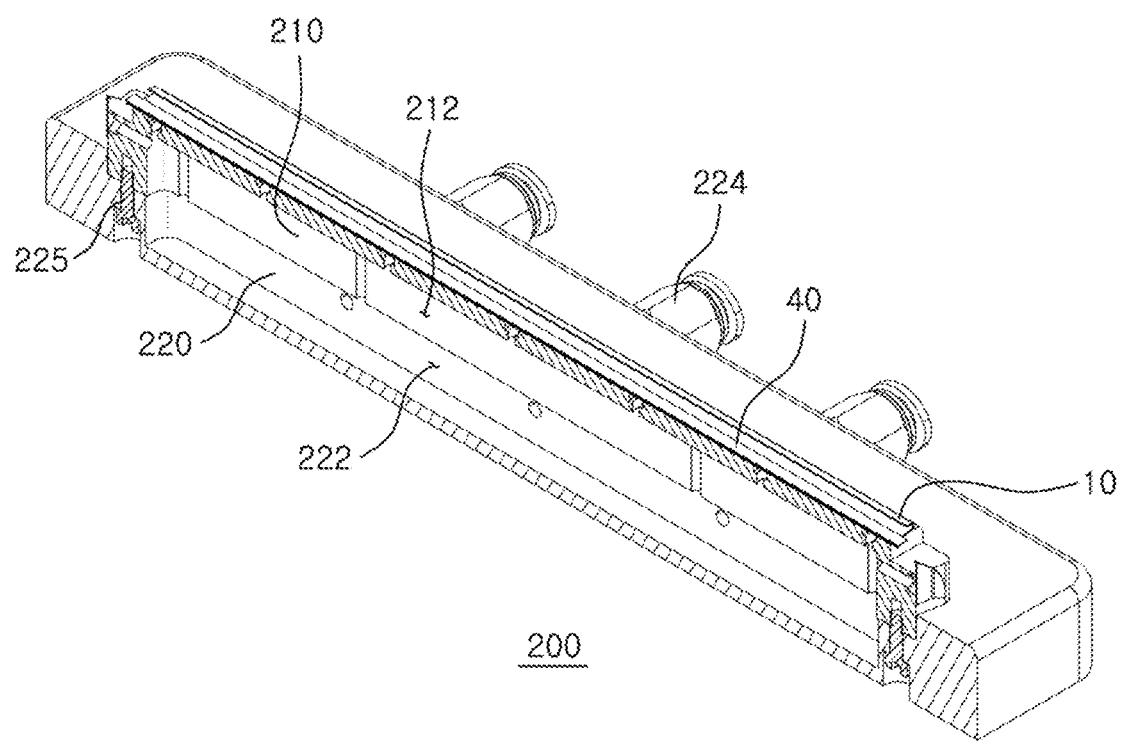
FIG. 9 is a cross-sectional view illustrating the tape attaching device of FIG. 8.
Figure 10:
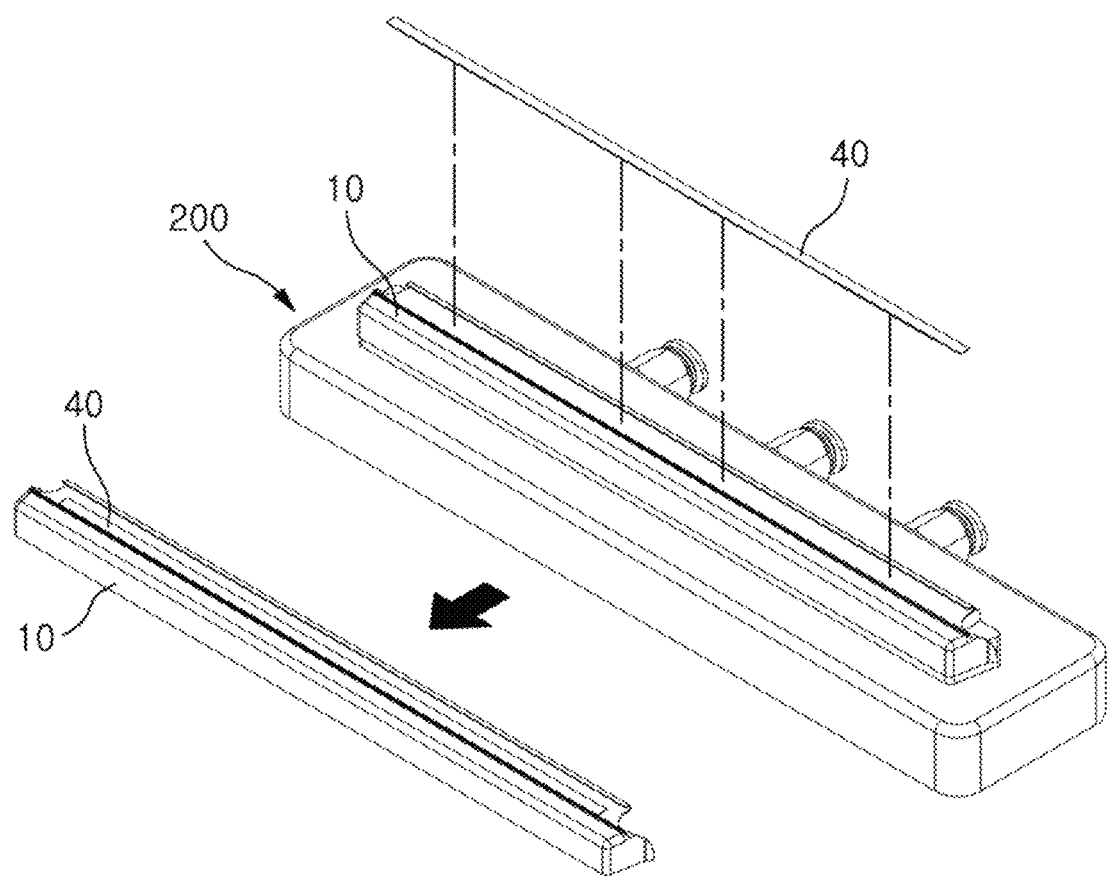
FIG. 10 is a perspective view illustrating the tape attaching device of FIG. 8 and shows an insulating sheet having the tape attached.

FIG. 8 is an exploded perspective view illustrating a tape attaching device for manufacturing an insulating sheet according to an embodiment of the present invention. FIG. 9 is a cross-sectional view illustrating the tape attaching device. FIG. 10 is a perspective view illustrating the tape attaching device and an insulating sheet having the tape attached.

As mentioned above, the insulating sheet manufactured according to the present invention is made of a very thin plastic material. For this reason, it is difficult to maintain the insulating sheet in a fixed position while attaching the tape to the insulating sheet. In addition, the shape of the insulating sheet may be deformed by external force, and this makes it very difficult to attach the tape disadvantageously. For this reason, the present invention provides a means for stably attaching the tape to a fixed position of the insulating sheet without any change of the shape.

Referring to FIGS. 8 to 10, the tape attaching device includes a jig unit 200 having a sheet suction jig 210 and a jig base 220, so that the tape is attached while the insulating sheet 10 is fixed in a pneumatic suctioning manner.

The sheet suction jig 210 is a jig to which the insulating sheet 10 is directly installed, and includes a first suction space 212 having an opened bottom and a hollowed inside and a jig body 211 having a plurality of suction holes 213 provided on a surface where the insulating sheet 10 is installed.

Such a jig body 211 is shaped to allow the entire inner surface of the insulating sheet 10 to be abuttingly fixed. In this case, the jig body 211 is mounted such that the surface of the insulating sheet 10 to which the tape 40 is attached faces the upper side of the jig body 211. In addition, a plurality of suction holes 213 are formed at regular intervals on each surface of the jig body 211 on which the insulating sheet 10 abuts. Accordingly, when vacuum is generated in the first suction space 212, all surfaces of the insulating sheet 10 are abuttingly fixed to the jig body 211 by means of each suction hole 213. As a result, it is possible to stably attach the tape without movement or deformation of the insulating sheet 10.

The jig base 220 is directly connected to a vacuum line (not shown) to provide a suction force to the sheet suction jig 210. The jig base 220 has a second suction space 222 having an opened top and a hollowed inside so as to provide a sealed space along with the first suction space 212, and a base 221 having a plurality of coupling holes 224 connected to the vacuum line on one side surface of the second suction space 222.

Specifically, while the sheet suction jig 210 and the jig base 220 are arranged vertically to provide a sealed suction space (first and second suction spaces 212 and 222) inside, the insulating sheet 10 is fixed to the sheet suction jig 210 placed in the upper side, and the vacuum line is connected to the jig base 220 placed in the lower side.

Note that the upper end of the second suction space 222 of the jig base 220 forms a stepped surface with an area wider than the horizontal area of the second suction space 222, so as to form a seating surface 223 where the opened lower surface of the sheet suction jig 210 is seated. The sheet suction jig 210 and the jig base 220 are engaged to each other by screws 225 on both left and right sides of the seating surface 223.

In this manner, using the tape attaching device according to the present invention, it is possible to easily attach the tape to an accurate position because the tape can be attached while the insulating sheet made of a very thin plastic material is installed to a fixed position by means of the suction jig without shape deformation.

Note that the tape 40 is a double-sided tape, and is attached to the insulating sheet 30 while a release agent is attached to a surface opposite to the surface attached to the insulating sheet 30.

<Insulating Sheet Bending Step>

Figure 11:
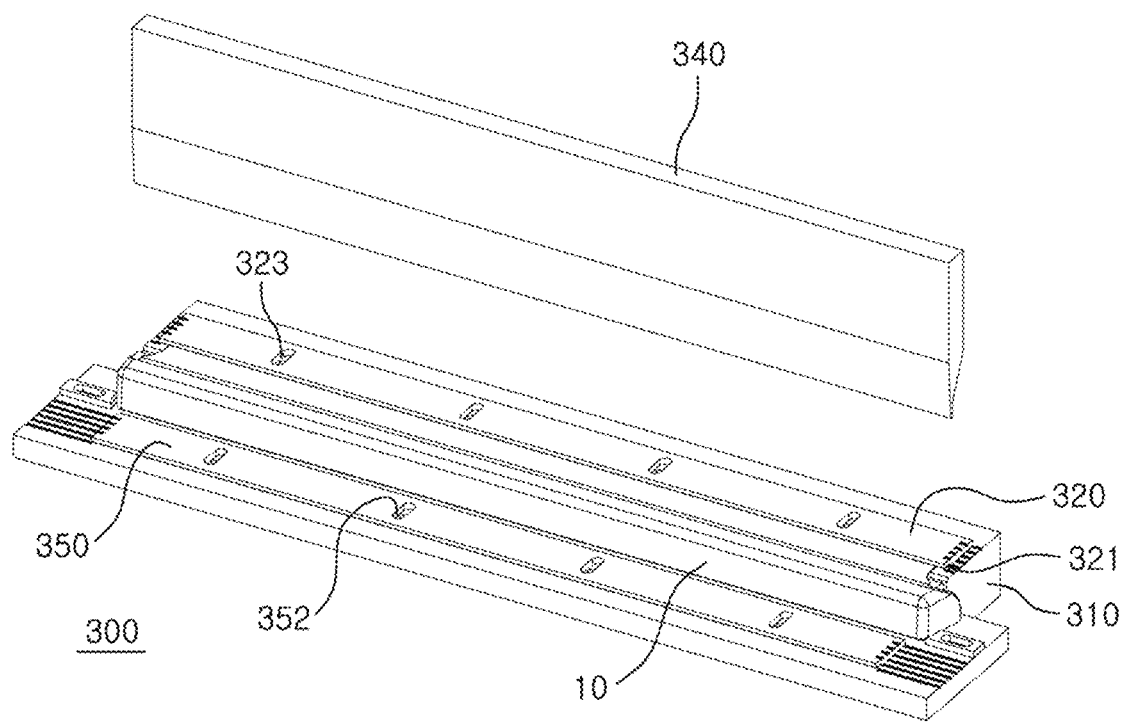
FIG. 11 is a perspective view illustrating a primary bending base jig for primary bending for an insulating sheet according to an embodiment of the present invention.
Figure 12:
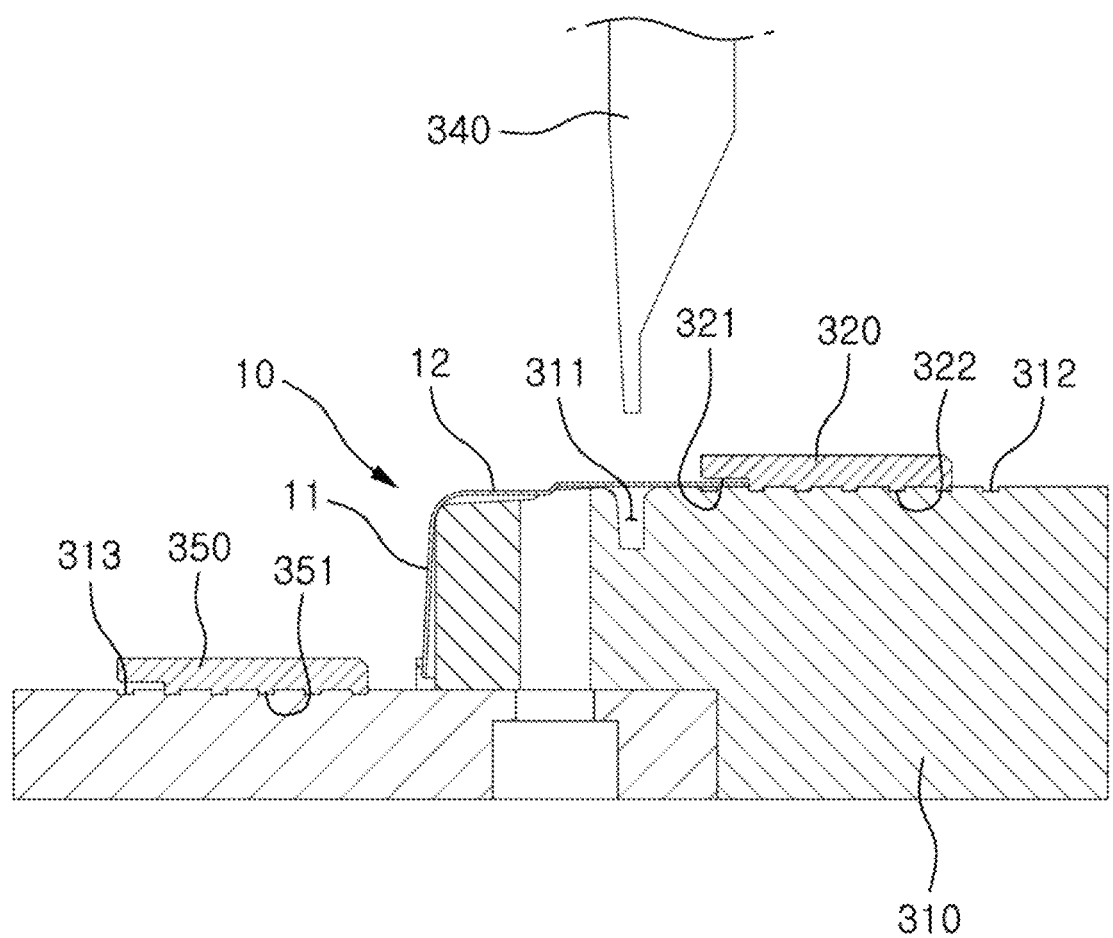
FIG. 12 is a cross-sectional view illustrating the primary bending base jig of FIG. 11.
Figure 13:
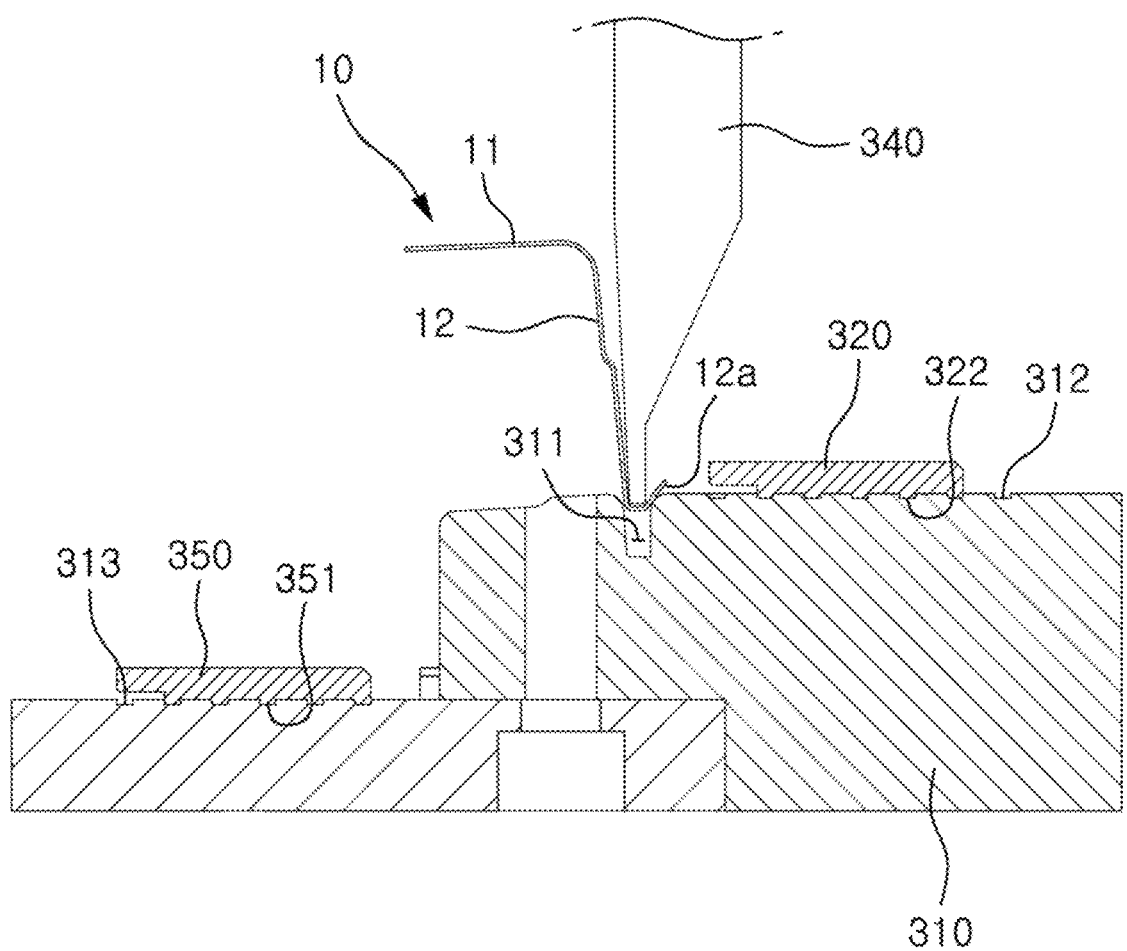
FIG. 13 is a diagram illustrating a state in which bending of the insulating sheet is completed by the primary bending base jig of FIG. 11.
Figure 14:
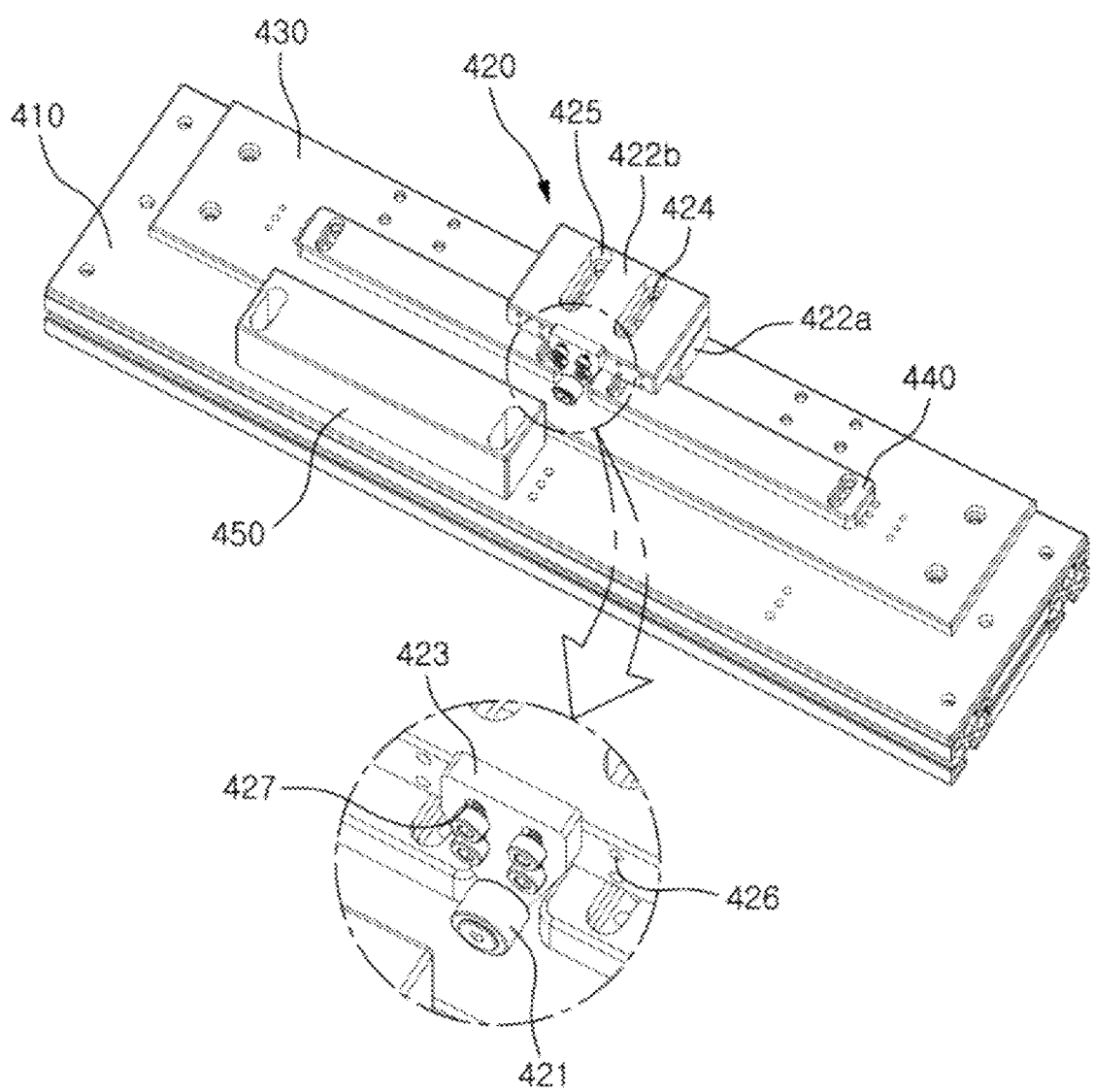
FIG. 14 is a perspective view illustrating a secondary bending device for secondary bending for an insulating sheet according to an embodiment of the present invention.
Figure 15:
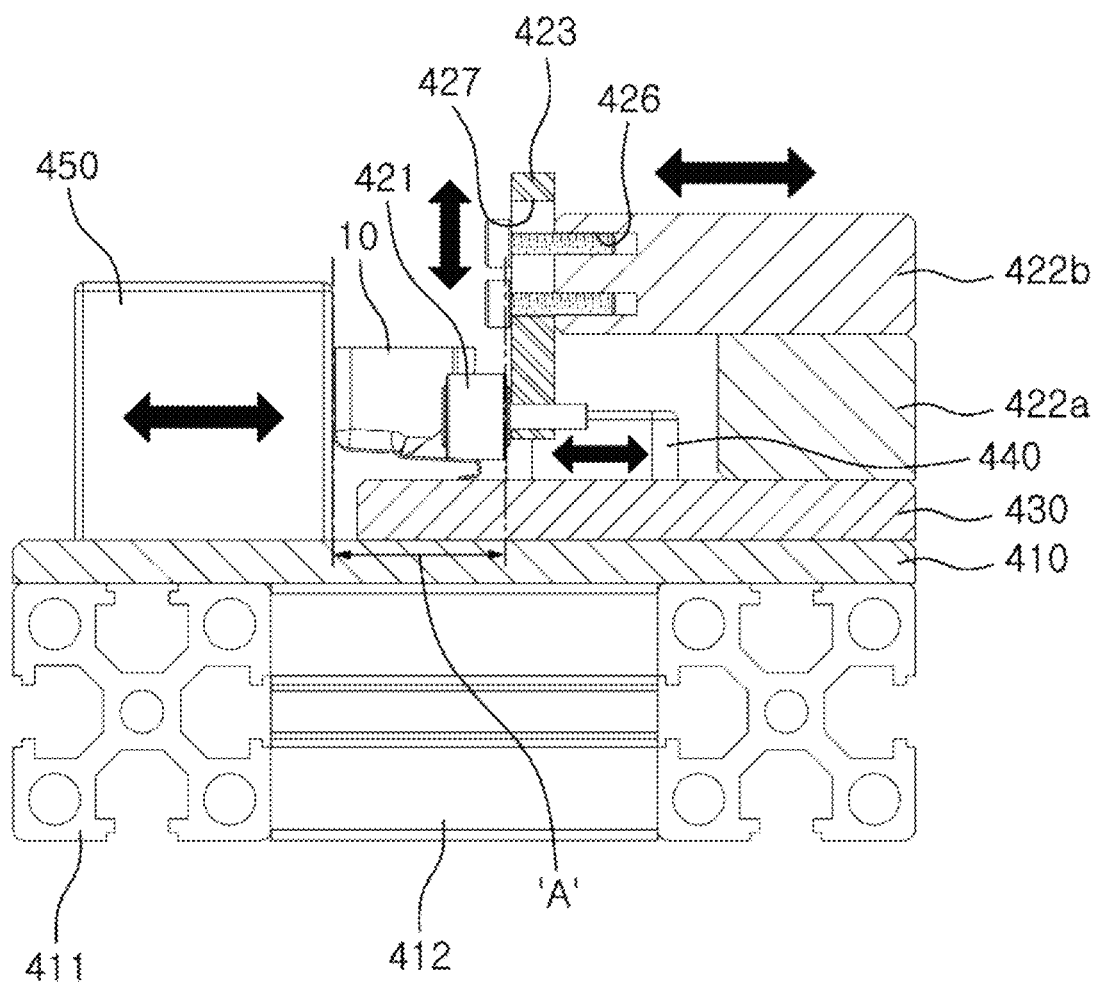
FIG. 15 is a cross-sectional view illustrating the secondary bending device of FIG. 14.

FIGS. 11 and 12 illustrate a primary bending base jig for primary bending of the insulating sheet according to an embodiment of the present invention. FIG. 13 illustrates a state in which bending of the insulating sheet is completed by the primary bending base jig. FIGS. 14 to 16 illustrates a secondary bending device for secondary bending of the insulating sheet according to an embodiment of the present invention.

As mentioned above, the insulating sheet manufactured according to the present invention is attached with a tape such that it can be securely fixed to the side surface of the battery tray, and the edge of the insulating sheet is fitted to the side surface of the tray.

For this purpose, the present invention provides a means for forming the edge of the insulating sheet as a fitting portion having a U-shaped cross section. However, the insulating sheet manufactured according to the present invention is made of a very thin plastic material. Therefore, when the applied load is released after the edge of the sheet is bent, a spring-back phenomenon occurs to restore its original shape. This makes it difficult to perform bending in a desired shape. In order to address this problem, according to the present invention, the inventors propose a method of performing primary bending for the insulating sheet at a predetermined angle by a punch and then sequentially performing secondary bending at a desired angle by a roller.

For this purpose, according to the present invention, the bending device for bending the insulating sheet is also provided dividingly as a primary bending device and a secondary bending device. Hereinafter, the primary bending device will be described first, and the secondary bending device will be described subsequently.

Referring to FIGS. 11 to 13, the primary bending device has a primary bending jig base 300 that supports the insulating sheet 10 in the course of the primary bending of the insulating sheet 10. The primary bending jig base 300 includes a base body 310, an upper plate 320, a side plate 330, and a lower plate 350.

The base body 310 has a rectangular parallelepiped block shape as a whole, and the insulating sheet 10 is fittingly installed in one side of the base body 310 in an inverted form. More specifically, the upper surface of the base body 310 abuttingly comes into contact with the inner surface of the bottom surface 12 of the insulating sheet 10, and the inner side of the vertical surface 11 of the insulating sheet 10 abuttingly comes into contact with the side surface of the base body 310. In addition, both side surfaces of the base body 310 abuttingly come into contact with the inner sides of both side surfaces 13 of the insulating sheet 10.

A trench 311 for receiving a pressure punch 340 inserted to a certain depth is provided on a side of the base body 310 abutting on the side of the insulating sheet 10 to be bent, that is, the upper surface of the base body 310 abuttingly coming into contact with the bottom surface 12 of the insulating sheet. As a result, as the pressure punch 340 enters the trench 311, the bottom surface 12 of the insulating sheet 10 is also bent at a certain angle while being pressed down to the trench 311.

Note that a means for preventing lifting of the bending surface (bottom surface 12) of the insulating sheet 10 in the course of bending of the insulating sheet 10 is provided behind the trench 311 of the base body 310. For this purpose, an upper plate 320 into which an edge of the insulating sheet 10 is fittingly inserted is provided in the base body 310 behind the trench 311. The upper plate 320 has a plate shape placed on the upper surface of the base body 310 and has a fitting space portion 321 having a height spaced apart from the base body 310 toward the trench 311. That is, as the insulating sheet 10 is installed in the base body 310, the bending surface of the insulating sheet 10 extends across the trench 311 so that its edge is placed in the fitting space portion 321 provided on the lower side the upper plate 310.

The bending operation performed while the insulating sheet 10 is installed in the primary banding jig base 300 mentioned above will be described. First, the pressure punch 340 descends and comes into contact with the bending surface (bottom surface 12) of the insulating sheet 10, and the pressure punch 340 descends further and enters the trench 311 deeper. Then, the edge portion subjected to the bending by pressing down the bending surface 12 is prevented from lifting by the upper plate 320, and a force of lifting the opposite side of the insulating sheet 10 is generated. Then, as the pressure punch 340 continues to enter the trench 311, as shown in FIG. 13, one side of the insulating sheet 10 with respect to the pressure punch 340 is lifted by the pressure punch 340, and the opposite edge of the insulating sheet 10 retreats out of the fitting space portion 321 of the upper plate 320 and is bent toward the trench 311.

Note that the upper plate 320 may be fixedly mounted to the base body 310. However, according to the present invention, the upper plate 320 is installed displaceably in the front-rear direction on the base body 310 such that its position can be flexibly adjusted depending on the length of the surface of the insulating sheet 10 to be bent. For this purpose, a plurality of stripe-shaped engagement grooves 312 are formed on the upper surface of the base body 310 at regular intervals along the width direction of the base body 310. Similarly, on the lower surface of the upper plate 320, a plurality of engagement protrusions 322 matching with the engagement grooves 312 are formed along the width direction of the upper plate 320. Accordingly, the upper plate 320 is fittingly fixed to the upper surface of the base body 310 in a groove-protrusion structure displaceably, so that an operator can adjust it more easily and accurately in adjustment of the front-rear position of the upper plate 320. For example, when the length of the bending surface increases by about 2 mm, the position of the upper plate may be changed from the engagement groove 312 at the reference position to the engagement groove 312 located two lines behind. As a result, it is possible to allow an operator to actively respond to a change of the size of the bending surface (bottom surface 12) of the insulating sheet 10. The upper plate 320 is fixed to the base body 310 by screw fastening. Note that the upper plate 320 has a long groove 323 elongating in the position change direction to fix the upper plate 320 to the base body 310 while allowing displacement.

Meanwhile, side plates 330 protruding at a certain height to both sides of the insulating sheet 10 are provided on the stepped lower surface of the base body 310. The side plate 310 provides a positional reference for installing the insulating sheet 10 in the base body 310, and prevents the insulating sheet 10 from being excessively separated to the side in the course of bending.

The lower plate 350 is placed in the front side at a predetermined interval from the vertical surface 11 of the insulating sheet 10 on the stepped lower surface of the base body 310 to prevent the insulating sheet 10 from being excessively pushed to the front in the course of bending. Similarly, the lower plate 350 is mounted to the base body 310 displaceably in the front-rear direction in the same structure as that of the upper plate 320 in order to allow an operator to actively adjust the position depending on the length of the vertical surface 11 of the insulating sheet 10. For this purpose, a plurality of engagement protrusions 351 elongating in the width direction are formed on the lower surface of the lower plate 350 at regular intervals, and engagement grooves 313 matching with the engagement protrusions 351 are formed on the upper surface of the base body 310 at regular intervals. In addition, a long groove 352 elongating in the position change direction is formed on the lower plate 350 to fix the lower plate 350 to the base body 310 while allowing displacement.

Meanwhile, the secondary bending device 400 finally bends the bending portion of the insulating sheet by a rotatable roller. For this purpose, the secondary bending device 400 includes a base plate 410, a pressure roller module 420, a roller pressing plate 430, and insulating sheet guides 440 and 450.

The base plate 410 has a rectangular parallelepiped plate shape as a whole and provides a base surface for mounting various components for the secondary bending. On the lower side of the base plate 410, a hollow profile 411, a block body 412, and the like are provided to support a load in the course of bending while maintaining a certain height.

The pressure roller module 420 is mounted on the upper surface of the base plate 410 to directly bend the insulating sheet 10 by means of the rotatable roller 421, and is structured to change the position of the roller 421 in three axis directions (X-axis, Y-axis and Z-axis directions) so as to actively adjust the position depending on the size of the insulating sheet 10 and the bending angle of the bending portion. The pressure roller module 420 for this purpose includes a roller support 422 displaceable in the front-back direction (Y-axis direction) and a roller mounting plate 423 displaceable in the left-right direction (X-axis direction) and the vertical direction (Z-axis direction).

The roller support 422 is mounted to the base plate 410 to support the roller mounting plate 423. The roller support 422 has a two-piece structure including a lower support 422a and an upper support 422b, detachably coupled to each other by bolts or the like. Note that the lower support 422a is fixedly installed to the base plate 410, and the upper support 422b is installed on the upper surface of the lower support 422a displaceably in the front-rear direction (Y-axis direction). For this purpose, a plurality of bolt fastening holes 424 are provided on the upper surface of the lower support 422a at regular intervals in the front-back direction (Y-axis direction), and the upper support 422b has bolt through-holes 424 drilled at the positions matching the bolt fastening holes 44 across the entire thickness. In this case, it is preferable that the bolt fastening holes 424 and the bolt through-holes 425 are arranged along two lines of the left and right sides to improve the fastening force. In addition, it is preferable that the bolt through-holes 425 are provided as elliptical long holes for convenience of the bolt fastening.

Meanwhile, the upper support 422b has a length of the front-back direction (Y-axis direction) longer than that of the lower support 422a. This makes it possible to efficiently arrange subsidiary components within a limited area of the base plate 410. For example, the position of the upper support 422b can be changed in the front-rear direction (Y-axis direction) without being interfered by an inner sheet guide 440 described later while the inner sheet guide 440 is placed under the upper support 422b.

The roller mounting plate 423 is provided on the front surface of the upper support 422b in a vertically erected posture, and has a roller 421 rotatably provided in the lower side. Such a roller mounting plate 423 is mounted displaceably in the vertical direction (Z-axis direction) and left-right direction (X-axis direction) on the front surface of the upper support 422b. For this purpose, a plurality of bolt fastening holes 426 are provided on the front surface of the upper support 422b in line with each other along the vertical and horizontal directions. In addition, a pair of long left and right bolt through-holes 427 through which bolts are inserted are formed in the roller mounting plate 423 at positions matching with the bolt fastening holes 426.

The roller 421 bends the portion of the insulating sheet subjected to the primary bending by rotational pressure, and preferably rotates constantly with high hardness while minimizing frictional force with the insulating sheet. For this purpose, the roller 421 is preferably made of a plastic or rubber material having low frictional force and high hardness. While a single roller 421 may be provided, multiple rollers may also be provided as necessary.

Meanwhile, the roller support 422 may be directly mounted to the base plate 410, so that the roller 421 directly presses the base plate 410 while coming into contact with the insulating sheet 10 in the course of bending of the insulating sheet 10. However, in this case, the base plate 410 may be damaged by the repetitive pressing operation of the roller 421, and thus, replacement cost may increase by replacing the entire base plate 410.

Advantageously, according to the present invention, a replaceable roller pressing plate 430 is further provided between the roller support 422 and the base plate 410. More specifically, a roller pressing plate 430 is mounted replaceably on the upper surface of the base plate 410, and the roller support 422 is mounted on the upper surface of the roller pressing plate 430. The roller pressing plate 430 supports the pressure of the roller 421 in the course of bending because the bending portion of the insulating sheet 10 is placed at the lower end of the roller 421 when the insulating sheet 10 passes therethrough. The roller pressing plate 430 may be formed of a durable material, for example, a metal material such as steel or aluminum.

The insulating sheet guides 440 and 450 mentioned above guide the insulating sheet 10 to an accurate bending position in the course of secondary bending of the insulating sheet 10. Specifically, the insulating sheet guides 440 and 450 include an inner sheet guide 440 that comes into contact with and supports the inner side of the insulating sheet 10 and a sheet outer guide 450 that comes into contact with and supports the outer side of the insulating sheet 10 in the course of bending. Note that the inner side of the insulating sheet 10 means the end of the side surface 13 (see FIG. 2) of the insulating sheet 10, and the outer side of the insulating sheet 10 means the vertical surface 11 (see FIG. 2) of the insulating sheet 10.

The inner sheet guide 440 has a long rectangular plate shape and is installed inside the roller 421 on the upper surface of the roller pressing plate 430 to support the inner side of the insulating sheet 10. The inner sheet guide 440 directly comes into contact with the insulating sheet 10, and is preferably formed of a material having low friction, for example, a plastic material such as PC, POM, or ABS. In addition, the inner sheet guide 440 may be installed in both left and right directions with respect to the roller 10 or selectively assembled in only one direction depending on convenience of the operator. Note that the inner sheet guide 440 is installed on the roller pressing plate 430 displaceably in the left-right direction (X-axis direction) such that its position can be adjusted flexibly depending on the length of the insulating sheet 10.

The outer sheet guide 450 has a rectangular parallelepiped block shape, and is installed on the upper surface of the base plate 410 in the outer side of the roller 421 to support the outer side (vertical surface 11) of the insulating sheet 10. The outer sheet guide 450 also directly comes into contact with the insulating sheet 10, and is preferably made of a material having low friction, for example, a plastic material such as PC, POM, or ABS. In addition, the outer sheet guide 450 may be provided in both left and right directions with respect to the roller 10 or selectively assembled in only one direction depending on convenience of the operator. Note that the outer sheet guide 440 may be installed on the base plate 410 displaceably in the left-right direction (X-axis direction) such that its position can be flexibly adjusted depending on the length of the insulating sheet 10.

In this manner, the inner sheet guide 440 and the outer sheet guide 450 are arranged in the inner and outer sides with respect to the roller 10 to support the inner and outer sides of the insulating sheet in the course of secondary bending of the insulating sheet and provide a bending allowance width ('A' in FIG. 15) for the insulating sheet. Note that the inner sheet guide 440 and the outer sheet guide 450 are displaceable in the front-back direction (Y-axis direction), so that the bending allowance width 'A' can be actively adjusted depending on the size of the insulating sheet.

Hereinafter, a secondary bending operation of the insulating sheet by using the secondary bending device 400 mentioned above will be described with reference to FIGS. 16A to 16C.

Figure 16A:
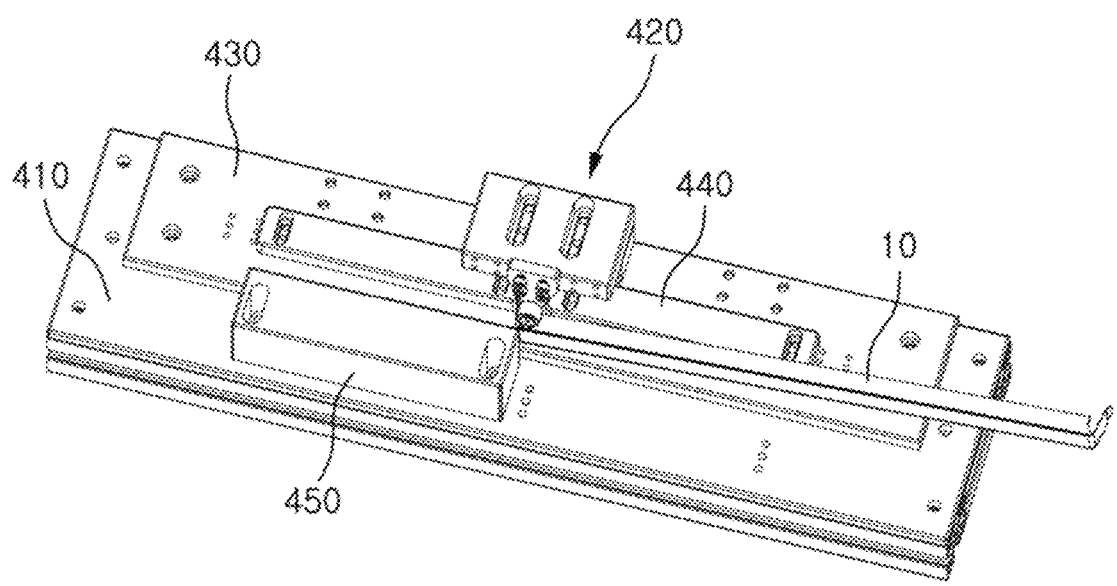
FIGS. 16A, 16B and 16C are diagrams illustrating an operation sequence of bending the insulating sheet by the secondary bending device of FIG. 14.

First, as shown in FIG. 16A, the insulating sheet 10 is moved while the primary bending portion of the insulating sheet 10 is obliquely inserted between the roller 421 and the roller pressing plate 430. Then, the roller 421 rotates, so that the primary bending portion of the insulating sheet 10 is naturally placed under the roller 421.

Figure 16B:
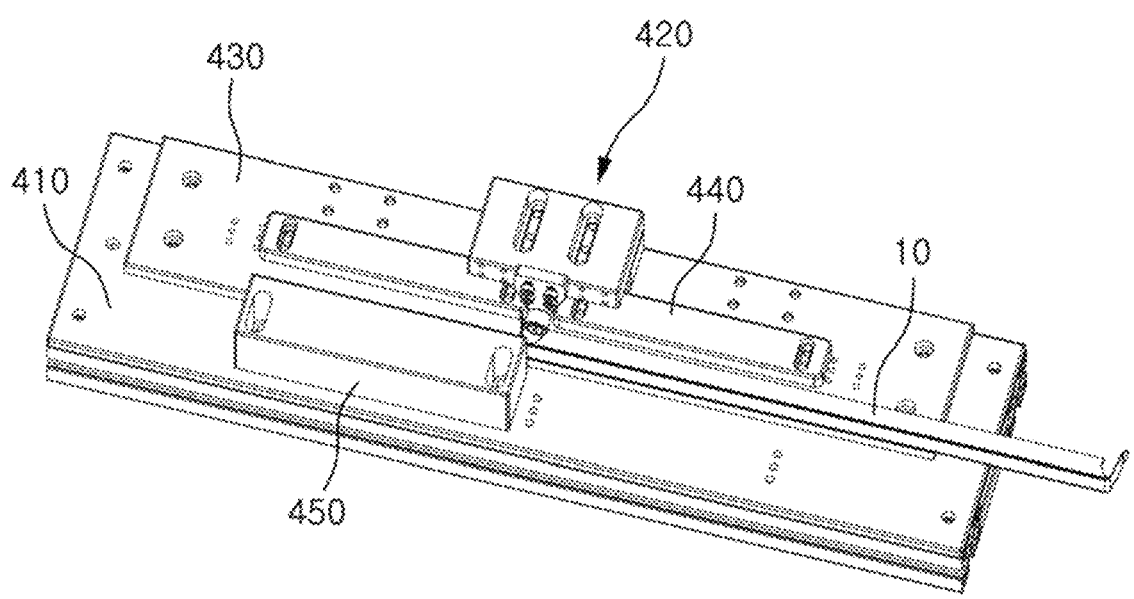

Subsequently, as shown in FIG. 16B, as the primary bending portion of the insulating sheet 10 is placed under the roller 421, the entire surface of the insulating sheet is horizontally aligned with the roller pressing plate 430. As a result, an initial position for the secondary bending is set.

Figure 16C:
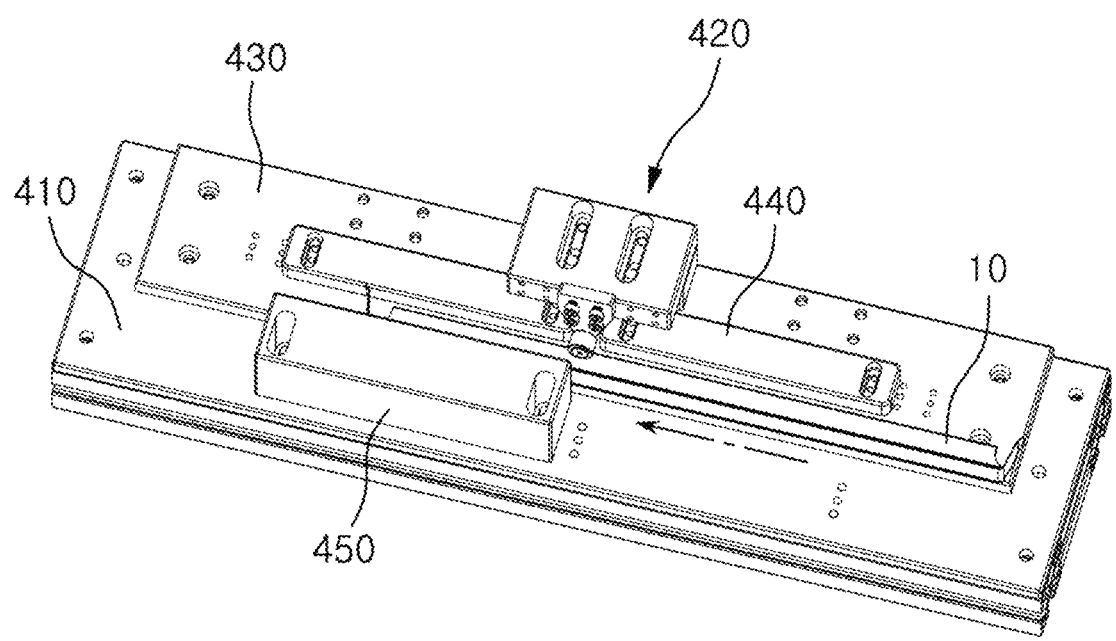

Finally, as shown in FIG. 16C, the insulating sheet 10 is moved in the direction (arrow direction) opposite to the insulating sheet insertion direction while the surfaces of the roller pressing plate 430 and the insulating sheet 10 are aligned horizontally. Then, the primary bending portion of the insulating sheet 10 passes between the roller 421 and the roller pressing plate 430, so that the secondary bending proceeds at a constant pressure and interval. While the insulating sheet 10 passes between the roller 421 and the roller pressing plate 430, the outer and inner sides of the insulating sheet 10 come into contact with the outer sheet guide 450 and the inner sheet guide 440, respectively, so that the insulating sheet 10 can be moved along a straight line at an appropriate position.

Figure 17:
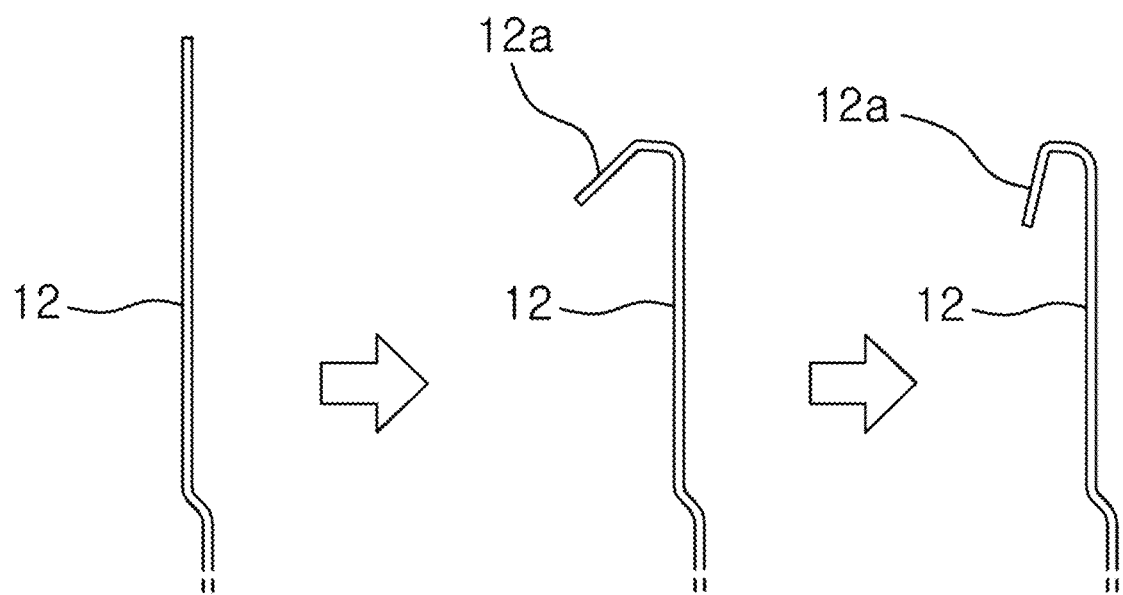
FIG. 17 is a diagram illustrating bending of the insulating sheet through the primary and secondary bending processes according to an embodiment of the present invention.

FIG. 17 sequentially shows a primary bending state in which the insulating sheet according to the present invention is primarily bent at a certain angle by a pressure punch and a secondary bending state in which the insulating sheet is finally secondarily bent by the pressure roller. As described above, according to an embodiment of the present invention, the primary and secondary bending processes are sequentially performed by the pressure punch and the pressure roller. Therefore, even when the insulating sheet made of a very thin plastic material is bent, a spring-back phenomenon in which the bending portion restores to its original shape is eliminated. As a result, it is possible to permanently maintain a desired bending shape. Therefore, the insulating sheets are securely fixed to both sides of the battery tray, so that the battery module can be stably insulated without being separated from the tray even when an external impact is applied.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the spirit and scope of the present invention.

REFERENCE SIGNS LIST

10: insulating sheet
20: battery module tray
30: sheet
31: groove
40: tape
100: laser cutting device
110: main body
120: jig unit
130: jig transfer unit
140: side laser cutting unit
150: planar laser cutting unit
200: tape attaching device
210: sheet suction jig
220: jig base
300: primary bending jig base
310: base body
311: trench
320: upper plate
321: fitting space portion
330: side plate
340: pressure punch 350: lower plate
400: secondary bending device
410: base plate
420: pressure roller module
421: roller
422: roller support
423: roller mounting plate
430: roller pressing plate
440: inner sheet guide
450: outer sheet guide

What is claimed is:

1. An apparatus for manufacturing an insulating sheet, comprising:
   a jig unit on which a flat sheet having a groove is seated;
   a jig transfer unit configured to transfer the jig unit;
   a side laser cutting unit installed beside the jig transfer unit and configured to cut a side surface of the groove by irradiating a laser beam to a side surface of the flat sheet;
   a planar laser cutting unit installed beside the jig transfer unit and configured to completely separate the flat sheet along the groove and form the insulating sheet by irradiating a laser beam from above the groove after cutting by the side laser cutting unit;
   a tape attaching device for attaching a tape to an outer surface of the insulating sheet; and
   a bending device for bending one end of the insulating sheet toward a place on the insulating sheet where the tape is attached.

2. The apparatus according to claim 1, wherein the side laser cutting unit includes a first laser cutting unit and a second laser cutting unit arranged as a pair facing each other on both sides of the jig transfer unit and configured to cut both side surfaces of the groove simultaneously by irradiating laser beams.

3. The apparatus according to claim 2, wherein the planar laser cutting unit includes a third laser cutting unit and a fourth laser cutting unit arranged at front and rear sides, respectively, above the jig transfer unit and wherein the third laser cutting unit and the fourth laser cutting unit are configured to cut the the groove subjected to the cutting by the side laser cutting unit to completely separate the insulating sheet from the flat sheet.

4. The apparatus according to claim 1, wherein the tape attaching device comprises a sheet installation jig that fixes the insulating sheet via pneumatic suction,
   wherein the sheet installation jig has
   a sheet suction jig for installing the insulating sheet, the sheet installation jig having a first suction space having an opened bottom and a hollowed inside and a jig body having a plurality of suction holes on a surface configured to hold the insulating sheet, and
   a jig base combined with the sheet suction jig configured to provide a suction force to the sheet suction jig, the jig base having a second suction space having an opened top and a hollowed inside to provide a sealed space along with the first suction space, and a base having a coupling hole where a vacuum line is connected on one side surface of the second suction space.

5. The apparatus according to claim 4, wherein an upper end of the second suction space forms a stepped surface with a cross-sectional area wider than that of a lower end of the second suction space to provide a seating surface where the sheet suction jig sits.

6. The apparatus according to claim 4, wherein the bending device comprises a primary bending jig base for primarily bending the insulating sheet,
   wherein the primary bending jig base has
   a base body having an inner surface configured to closely fit the insulating sheet, the base body having a trench formed to receive a pressure punch configured to bend the insulating sheet, and
   an upper plate provided at a rear of the trench in the base body to form a fitting space portion configured to receive an edge of the insulating sheet.

7. The apparatus according to claim 6, further comprising a lower plate configured to prevent the insulating sheet from being pushed to a front side during bending of the insulating sheet.

8. The apparatus according to claim 7, wherein the upper plate and the lower plate are configured to be fixably mounted to the base body by
   a plurality of engagement protrusions formed at regular intervals on the base body, and
   a plurality of engagement grooves formed between the engagement protrusions.

9. The apparatus according to claim 6, further comprising a secondary bending device configured to perform secondary bending for the insulating sheet after primary bending,
   wherein the secondary bending device has
   a base plate,
   a pressure roller module provided over the base plate and configured to press and bend the insulating sheet with a roller mounted for rotation, and
   inner and outer sheet guides respectively provided on opposite sides of the roller perpendicular to the rolling direction, the inner and outer sheet guides configured to guide the insulating sheet to a bending position by contacting inner and outer sides of the insulating sheet.

10. The apparatus according to claim 9, wherein the pressure roller module has a lower support fixedly installed on the base plate and an upper support displaceably installed over the lower support, and
    a roller mounting plate displacably installed on the upper support and provided with the roller.

11. The apparatus according to claim 9, wherein a roller pressing plate is replaceably installed between the base plate and the lower support.

* * * * *